(12) United States Patent
Viswanath et al.

(10) Patent No.: US 8,661,391 B1
(45) Date of Patent: Feb. 25, 2014

(54) SPARE CELL INSERTION BASED ON REACHABLE STATE ANALYSIS

(71) Applicant: International Business Machines Corporation, Armonk, NY (US)

(72) Inventors: Manikandan Viswanath, South Burlington, VT (US); Samuel I. Ward, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/732,989

(22) Filed: Jan. 2, 2013

(51) Int. Cl.
G06F 17/50 (2006.01)

(52) U.S. Cl.
USPC .......................................................... 716/119

(58) Field of Classification Search
USPC ................................................ 716/121, 119
See application file for complete search history.

(56) References Cited

U.S. PATENT DOCUMENTS

| 5,623,420 | A | 4/1997 | Yee et al. |
| 6,791,355 | B2 | 9/2004 | Vergnes |
| 6,993,738 | B2 | 1/2006 | Brazell et al. |
| 2012/0054707 | A1 | 3/2012 | Goodman et al. |
| 2012/0066654 | A1* | 3/2012 | Hopkins et al. ............... 716/102 |

OTHER PUBLICATIONS

Chang et al., "Reap What You Sow: Spare Cells for Post-Silicon Metal Fix", ISPD'08, Apr. 13-16, 2008, pp. 1-8.*
Jiang, Zhe-Wei, et al., "Spare-Cell-Aware Multilevel Analytical Placement," 46th Annual Design Automation Conference, pp. 430-435 (2009).
Chang, Kai-hui, et al., "Reap What You Sow: Spare Cells for Post-Silicon Metal Fix," International Symposium on Physical Design (2008).
Chen, Yen-Pin, et al., "ECO Timing Optimization Using Spare Cells and Technology Remapping," IEEE Trans. on Computer-Aided Design of Integrated Circuits and Systems, vol. 29, issue 5 (May 2010).

* cited by examiner

*Primary Examiner* — Vuthe Siek
*Assistant Examiner* — Aric Lin
(74) *Attorney, Agent, or Firm* — Matthew W. Baca; Jack V. Musgrove

(57) ABSTRACT

Spare cells are inserted in a region of an integrated circuit design based on a logic complexity of the region. The logic complexity can be computed based on the number of reachable states of digital logic in the region, and can be correlated to a desired spare cell insertion rate which is then compared to the actual spare cell utilization in the region. The target spare cell rate can further based on logic complexity values for neighboring regions with a proximity penalty.

12 Claims, 4 Drawing Sheets

SPARE CELL INSERTION BASED ON REACHABLE STATE ANALYSIS

BACKGROUND OF THE INVENTION

1. Field of the Invention

The present invention generally relates to the design of integrated circuits, and more particularly to a method of inserting spare cells in an integrated circuit design to accommodate engineering changes.

2. Description of the Related Art

Integrated circuits are used for a wide variety of electronic applications, from simple devices such as wristwatches, to the most complex computer systems. A microelectronic integrated circuit (IC) chip can be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements combined to perform a logic function. Cell types include, for example, core cells, scan cells, input/output (I/O) cells, and memory (storage) cells.

An IC chip is fabricated by first conceiving a logical (behavioral) description for the circuit, and converting that logical description into a physical description, or geometric layout. This process is carried out in steps, such as first generating a register-transfer level (RTL) description of the circuit based on the logical description, and then using logic synthesis to derive a gate level description or "netlist." A netlist is a record of all of the nets (interconnections) between cell pins, including information about the various components such as transistors, resistors and capacitors. The circuit layout is then checked to ensure that it meets all of the design requirements, particularly timing requirements, and may go through several iterations of analysis and refinement.

Cell placement in semiconductor fabrication involves a determination of where particular cells should optimally (or near-optimally) be located in a layer of an integrated circuit device. Due to the large number of components and the details required by the fabrication process for very large scale integrated (VLSI) devices such as microprocessors and application-specific integrated circuits (ASICs), physical design is not practical without the aid of computers. As a result, most phases of physical design extensively use computer-aided design tools, and many phases have already been partially or fully automated. Automation of the physical design process has increased the level of integration, reduced turn around time and enhanced chip performance. Several different hardware-description programming languages (HDL) have been created for electronic design automation, including Verilog, C, VHDL and TDML. A typical electronic design automation system receives one or more high level behavioral descriptions of an IC device, and translates this high level design language description into netlists of various levels of abstraction.

Once a design is mostly finished, slight modifications may still be required to meet last-minute changes to specifications or for other reasons, usually relayed as an engineering change order (ECO). Because the circuit design is substantially complete (i.e., it conforms to various design requirements such as timing and slew), it is important to minimize the impact of any changes which might otherwise lead to violations and thus require additional iterations of the design steps, meaning significant computational expense. In order to alleviate this predicament, designers place filler (ECO) cells in the circuit design which have no function other than providing spare locations as needed for later changes. These spare locations can be provided in additional to surplus latches or other components that are inserted in a design. A certain percentage of the total number of cells is typically designated for filler cells, and those cells are randomly placed throughout the layout.

SUMMARY OF THE INVENTION

The present invention is generally directed to a method of placing spare cells in an integrated circuit design by receiving a description of the integrated circuit design which includes a plurality of cells interconnected to form a plurality of nets, identifying at least one region of the integrated circuit design having digital logic, assigning a logic complexity value to the region, and inserting a number of spare cells in the region based on the logic complexity value. The logic complexity value can be correlated to a desired spare cell rate for the region, so the process can calculate an actual spare cell utilization rate for the region, and determine that the actual spare cell utilization rate is less than the desired spare cell rate. In the illustrative implementation the logic complexity value is computed based on the number of reachable states of the digital logic in the region. The complexity value can further based on logic complexity values for neighboring regions with a proximity penalty.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The use of spare cells greatly simplifies implementation of ECOs but there can still be problems with the locations of these cells. Since the filler percentage is applied globally to an entire design, some areas of the circuit which are more stable can end up getting too many filler cells, while other areas do not get enough. Furthermore, typical placement tools can push filler cells away from the most critical logic (which is often unstable) so even if there are filler cells available, they may not be located close enough to be of use for timing/logic fixes. Placement tools that partition the logic into separate bins can experience additional stability issues whenever the bin sizes or locations change.

Placement tools (particularly those which attempt to minimize wire length using quadratic placement) naturally pull connected logic together very tightly. This logic clustering effect can be countered by introducing a spreading factor to artificially increase instance sizes globally in a circuit design or portion thereof, i.e., a macro. Forcing cells within the macro to separate in this manner also improves routing and congestion issues. However, this spreading force is not effective for ECO work because it adds only a small amount of space to a large region instead of targeting areas that have a higher potential to change. These problems are exacerbated in high density circuit designs which have gone through multiple ECOs. The interior filler cells are exhausted early on, leaving an insufficient number of spare cell locations that are still close enough to associated logic gates.

It would, therefore, be desirable to devise an improved method of spare cell insertion which could more intelligently place the spare cells. It would be further advantageous if the method could increase the availability of spare cells in those areas of an integrated circuit design which are more likely to require engineering fixes. The present invention achieves these advantages by introducing a novel spare cell placement algorithm that assigns complexity values to logic regions. Spare cells can be inserted into a region based on the complexity of the region (e.g., in proportion to the complexity) under the assumption that increased logic complexity leads to increased errors and thus, the need for additional engineering tweaks and more spare cells. There is a better overall coverage because more spare cells are inserted closer to where they are needed. This approach also allows for fewer overall spare cells, thereby reducing the impact on area (i.e., timing/power).

Figure 1:
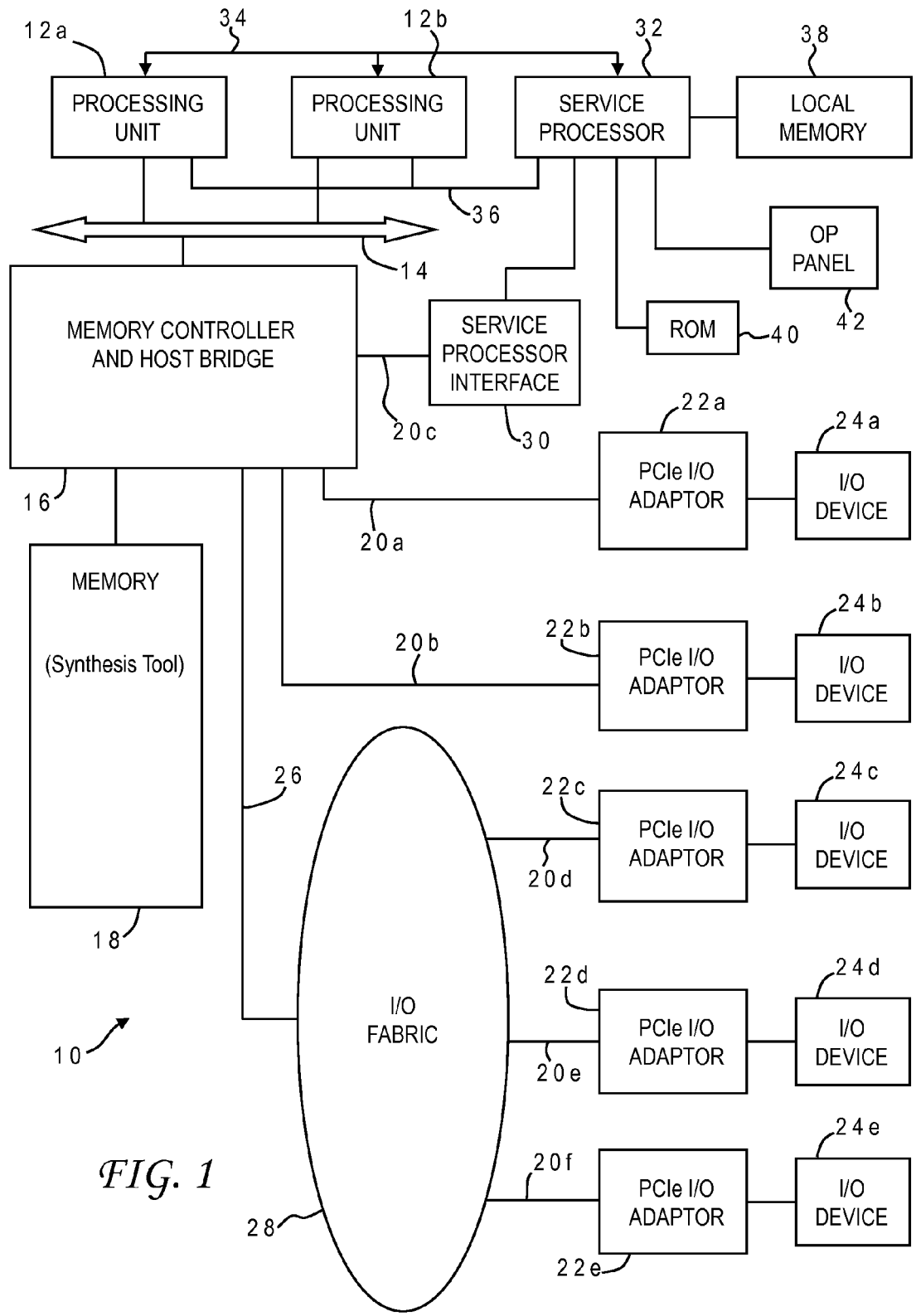
FIG. 1 is a block diagram of a computer system programmed to carry out integrated circuit design in accordance with one implementation of the present invention.

With reference now to the figures, and in particular with reference to FIG. 1, there is depicted one embodiment 10 of a computer system in which the present invention may be implemented to carry out the design of logic structures in an integrated circuit. Computer system 10 is a symmetric multiprocessor (SMP) system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the circuit design application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, written for a variety of platforms such as an AIX environment or operating systems such as Windows 7 or Linux. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such storage media excludes transitory media such as propagating signals.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 10 carries out program instructions for a novel spare cell insertion technique to manage engineering change orders as part of an overall circuit design process. Accordingly, a program embodying the invention may include conventional aspects of various circuit design tools, and these details will become apparent to those skilled in the art upon reference to this disclosure.

Figure 2:
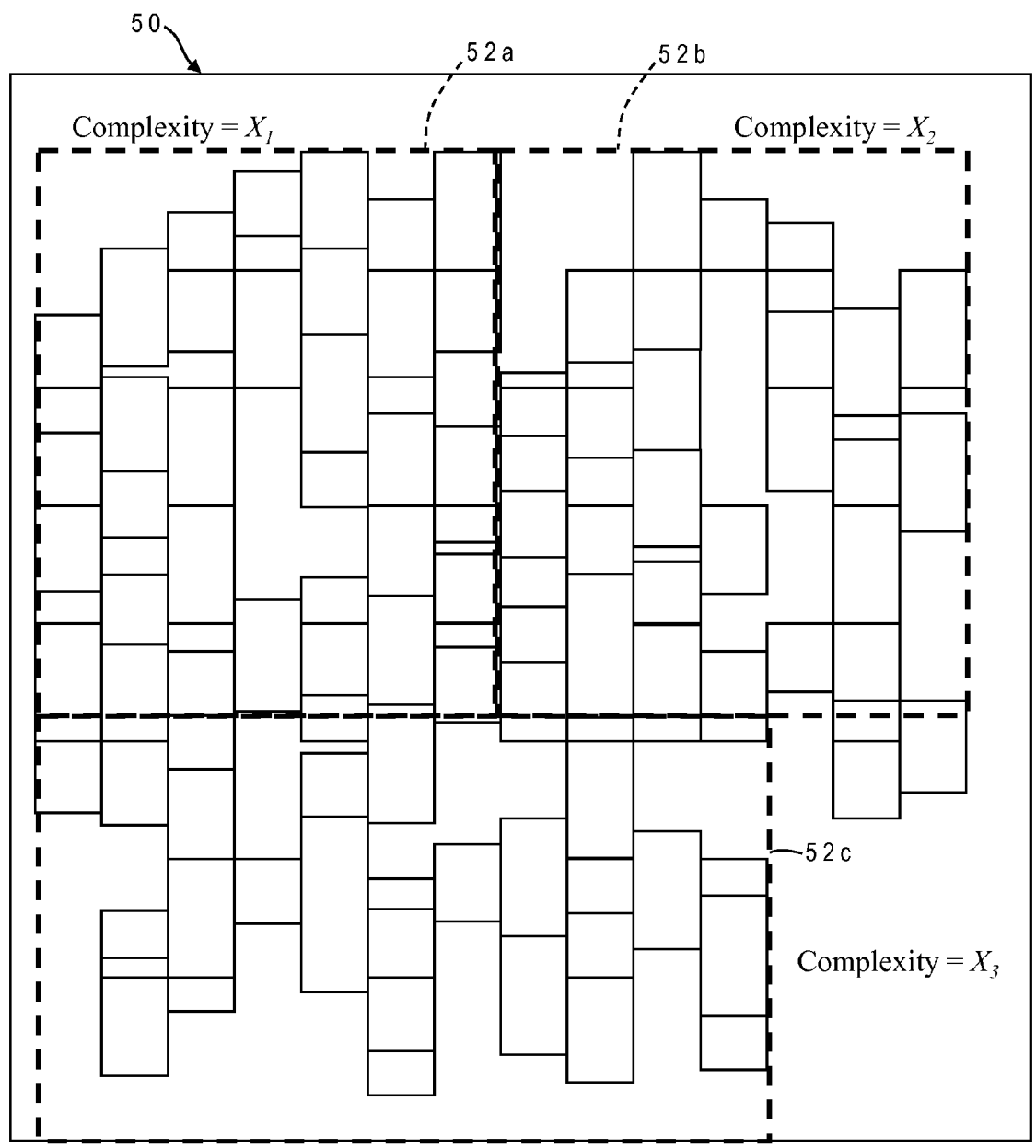
FIG. 2 is a plan view of an integrated circuit layout illustrating different regions of the design which have been assigned different logic complexity values in accordance with one implementation of the present invention.

Referring now to FIG. 2, there is depicted a simplified layout 50 of an integrated circuit design, or portion thereof such as a macro, which may be enhanced by inserting spare cell locations for engineering change orders (ECOs) in accordance with an exemplary application of the present invention. Layout 50 includes a plurality of cells having various sizes and functions according to the intended use of the integrated circuit. The cells can be laid out in an orthogonal coordinate system using horizontal and vertical tracks to provide interconnections between the cells. Layout 50 may be one layer of a multi-layer macro or integrated circuit design. Layout 50 is simplified in that it shows a relatively small number of cells and tracks. State of the art designs for microprocessors and application-specific integrated circuits (ASICs) can have thousands of cells with hundreds of tracks. Computer system 10 can receive a circuit description for layout 50 in the form of a hardware description language (HDL) file created by a designer or an electronic design automation tool. Layout 50 may be an initial layout for the integrated circuit design, or may be a layout resulting from one or more iterations of cell placement and circuit wiring, or other physical design steps.

In accordance with the present invention, different logic complexity values $X_1$, $X_2$, $X_3$ have been assigned to different regions 52a, 52b, 52c. The regions can be derived manually or automatically by performing state machine simulation on the high level design language. The logic simulation can define which cone of logic has the highest reachable state. Bins can be associated with the cones of logic, and the physical regions can be carved out based on the bins. While the regions shown are all rectangular, they could be other shapes, e.g., composites of rectangles.

Although the values may be manually assigned by an experienced designer to reflect the complexity of the circuitry within each region, the values are preferably computed based on various features of the circuitry. In the exemplary implementation, the logic complexity is based on the number of reachable logic states of the circuitry within the region. The circuitry is considered as a state machine having various inputs which deterministically result in a limited number of logical (digital) states of components in the region such as gates, latches, etc. The state machine complexity (reachability) analysis may be performed using conventional methods such as reduced-ordered binary decision diagrams or partitioned-ordered binary decision diagrams. Alternatively, satisfiability-based (SAT) techniques can be used. In the preferred embodiment, computer system 10 determines the number of reachable states by performing a backtrack search algorithm. If there are more reachable states then it is assumed that there is an increased probability of verification errors within the logic. The number of reachable states can accordingly be used to derive a complexity value, e.g., the complexity value is equal to or proportional to the number of reachable states, which can be very large for some designs.

While the logic complexity may by itself be used to directly determine a desired spare cell insertion rate for the entire region, the present invention can optionally take into consideration the complexities of neighboring regions or bins of the layout. In computing a spare cell insertion rate for a given region x surrounded by a number j of other regions, computer system 10 can compute a complexity-aware logic density D(x) with a proximity penalty based on the distance $d_j$ to the adjacent regions and their assigned complexity values $\delta_j$ (e.g., number of reachable states). In other words, the complexity-aware density function effectively increases the spare cell insertion rate for a region if neighboring regions are highly complex.

Figure 3:
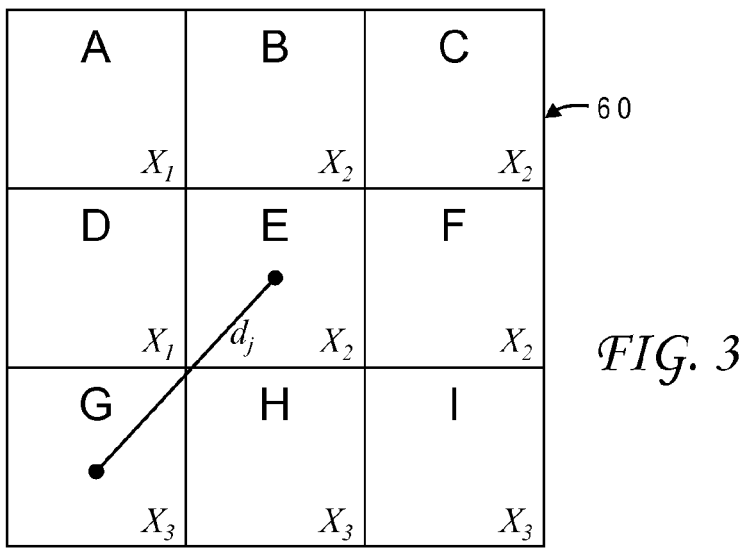
FIG. 3 is a plan view depicting a simplified example for computing a complexity-aware density of a region with a proximity penalty in accordance with one implementation of the present invention.

FIG. 3 illustrates a simplified example wherein a layout includes nine regions labeled A through I, with region E being in the center and adjacent to each of the other regions. In actual practice the regions are not necessarily square or aligned. Regions A and D have been assigned a first complexity value $X_1$, regions B, C, E and F have been assigned a second complexity value $X_2$, and regions G, H and I have been assigned a third complexity value $X_3$. The distance $d_j$ can be measured in various ways such as corner to corner, or center to center as seen in FIG. 3. The computed density for region E is accordingly reduced based on the complexities of the surrounding regions. In the illustrative implementation the logic density is given by the formula $$D(x)=1-e^{(-\lambda\delta_x)}-\Sigma_j[p(d_j)*(1-e^{(-\lambda\delta_j)})]$$

where $\lambda$ is a global, user-defined parameter (generally very small) that can be used to control the rate at which the density of a region is reduced, and p(d) is a weighted penalty function for surrounding regions. Accordingly, for example, if the complexities of regions A-D and F-I are not at all complex, then region E will have practically no proximity penalty, but if the surrounding regions are very complex, then the density of region E will be penalized.

Figure 4:
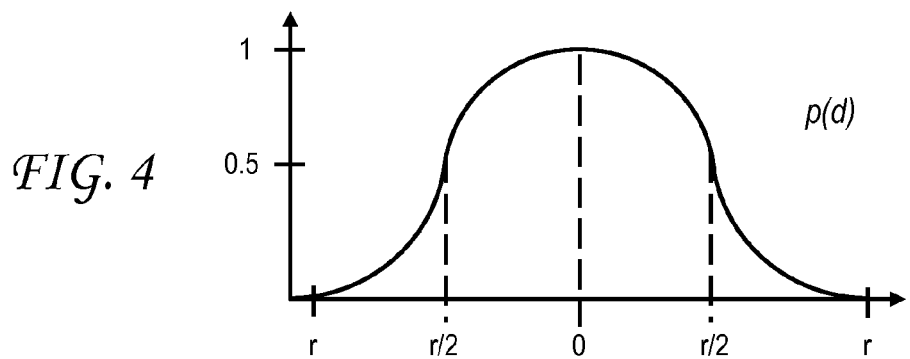
FIG. 4 is a graph of a weighted penalty function for surrounding areas used in the computation of the complexity-aware density in accordance with one implementation of the present invention.
Figure 5:
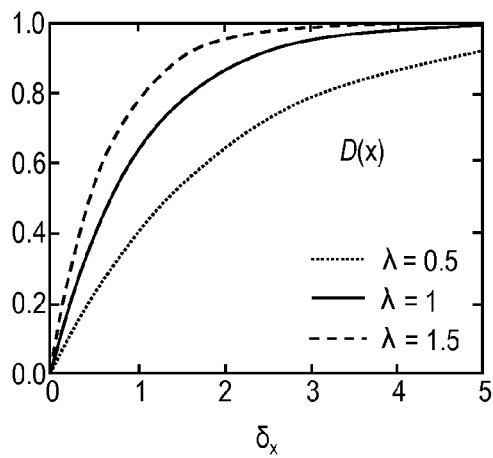
FIG. 5 is a graph showing different density functions which vary based on a global parameter that controls the rate at which the density of a region is reduced in accordance with one implementation of the present invention.

FIG. 4 shows a preferred distance weighting penalty for the function p(d). This function may be defined as $$p(d) = \begin{cases} 1 - \frac{2d^2}{r^2} & 0 \le d < r/2 \\ \frac{2(r-d)^2}{r^2} & r/2 \le d \le r \\ 0 & d > r \end{cases}$$

where r is a cutoff distance after which no proximity penalty applies, i.e., the logic density for a given region is unaffected by any other region which is more than a distance r away. The control parameter $\lambda$ affects the sharpness of the logic density curve, i.e., how sensitive the density is to proximity effects. FIG. 5 illustrates three exemplary curves of D(x) for $\lambda$ values of 0.5, 1 and 1.5.

Once the complexity-aware density is computed for a region, it can be correlated to a desired spare cell insertion rate in either a linear or non-linear fashion.

Figure 6:
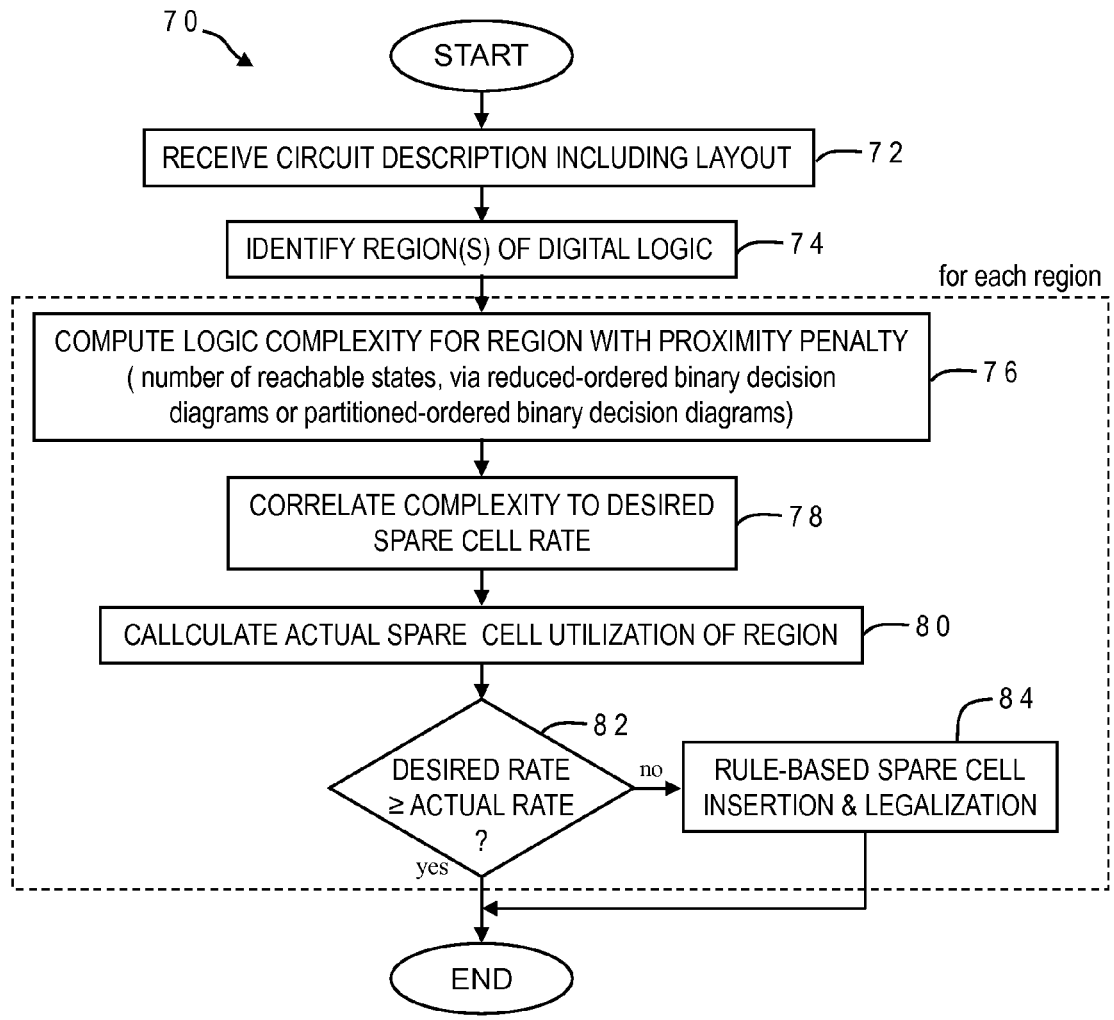
FIG. 6 is a chart illustrating the logical flow for a complexity-aware spare cell insertion process in accordance with one implementation of the present invention.

The invention may be further understood with reference to the chart of FIG. 6 which illustrates the logical flow for a complexity-aware spare cell insertion process in accordance with one implementation of the present invention. The process begins by receiving a circuit description or netlist which includes an initial placement (72). The initial placement may for example be from a previous synthesis operation. Different regions of digital logic in the circuit are identified (74), and complexity values are computed for each region using a reachability analysis, for example, a binary decision diagram (76). This computation may include the proximity penalty based on complexities of adjacent regions. The resulting complexity value is correlated to a desired spare cell insertion rate (78). The actual spare cell utilization of each region is calculated (80). The utilization rate can be defined as the total area of all spare cells currently within the region divided by the region area. The target utilization rate for the region is compared to the actual utilization rate to see if the target is met (82). If not, rule-based spare cell placement using conventional techniques can be performed for the region to insert a sufficient number of spare cells, including legalization (84). The entire process 70 of FIG. 6 may be part of a larger physical synthesis procedure, for example, placement directed synthesis which may include other conventional optimizations such as technology mapping, physical placement, electrical correction, and timing legalization. Process 70 may also be repeated as part of the larger synthesis procedure.

The present invention thereby enables the compaction of regions that are less complex producing higher density layouts, and spreading regions that are more complex producing better spare cell coverage. This approach allows for fewer overall spare cells to be used because spare cells are inserted where they are most needed, reducing the impact on area (and timing/power).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of placing spare cells in an integrated circuit design comprising:
   receiving a description of the integrated circuit design which includes a plurality of cells interconnected to form a plurality of nets, by executing first program instructions in a computer system;
   identifying at least one region of the integrated circuit design having digital logic, by executing second program instructions in the computer system;
   computing a logic complexity value for the region based on the number of reachable logic states of the digital logic in the region, by executing third program instructions in the computer system; and
   inserting a number of spare cells in the region based on the logic complexity value, by executing fourth program instructions in the computer system.

2. The method of claim 1 further comprising correlating the logic complexity value to a desired spare cell rate for the region.

3. The method of claim 2 further comprising calculating an actual spare cell utilization rate for the region, and determining that the actual spare cell utilization rate is less than the desired spare cell rate.

4. The method of claim 1 wherein the logic complexity value is further based on logic complexity values for other regions which are adjacent to the region wherein the logic complexity values for the other regions are weighted by a penalty function according to proximity of the other regions.

5. A computer system comprising:
   one or more processors which process program instructions;
   a memory device connected to said one or more processors; and
   program instructions residing in said memory device for placing spare cells in an integrated circuit design by receiving a description of the integrated circuit design which includes a plurality of cells interconnected to form a plurality of nets, identifying at least one region of the integrated circuit design having digital logic, computing a logic complexity value for the region based on the number of reachable logic states of the digital logic in the region, and inserting a number of spare cells in the region based on the logic complexity value.

6. The computer system of claim 5 wherein said program instructions further correlate the logic complexity value to a desired spare cell rate for the region.

7. The computer system of claim 6 wherein said program instructions further calculate an actual spare cell utilization rate for the region, and determine that the actual spare cell utilization rate is less than the desired spare cell rate.

8. The computer system of claim 5 wherein the logic complexity value is further based on logic complexity values for other regions which are adjacent to the region wherein the logic complexity values for the other regions are weighted by a penalty function according to proximity of the other regions.

9. A computer program product comprising:
   a computer-readable storage medium; and
   program instructions residing in said storage medium for placing spare cells in an integrated circuit design by receiving a description of the integrated circuit design which includes a plurality of cells interconnected to form a plurality of nets, identifying at least one region of the integrated circuit design having digital logic, computing a logic complexity value for the region based on the number of reachable logic states of the digital logic in the region, and inserting a number of spare cells in the region based on the logic complexity value.

10. The computer program product of claim 9 wherein said program instructions further correlate the logic complexity value to a desired spare cell rate for the region.

11. The computer program product of claim 10 wherein said program instructions further calculate an actual spare cell utilization rate for the region, and determine that the actual spare cell utilization rate is less than the desired spare cell rate.

12. The computer program product of claim 9 wherein the logic complexity value is further based on logic complexity values for other regions which are adjacent to the region wherein the logic complexity values for the other regions are weighted by a penalty function according to proximity of the other regions.

* * * * *